C. F. HENDERSON.
AUTOMATIC SPARK ADVANCING COUPLING.
APPLICATION FILED MAY 14, 1917.
1,304,768.
Patented May 27, 1919.
2 SHEETS—SHEET 1.
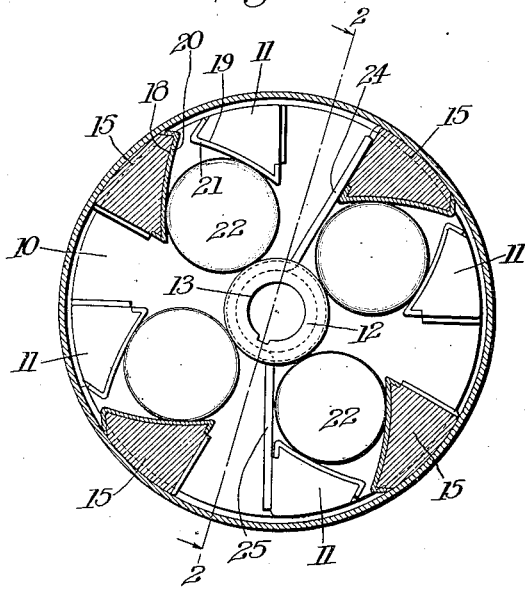
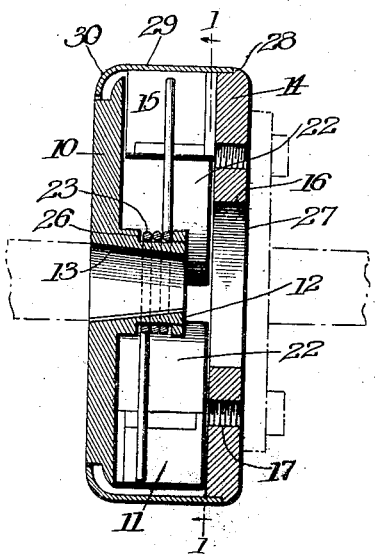
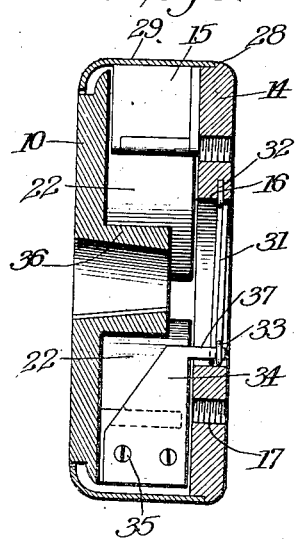
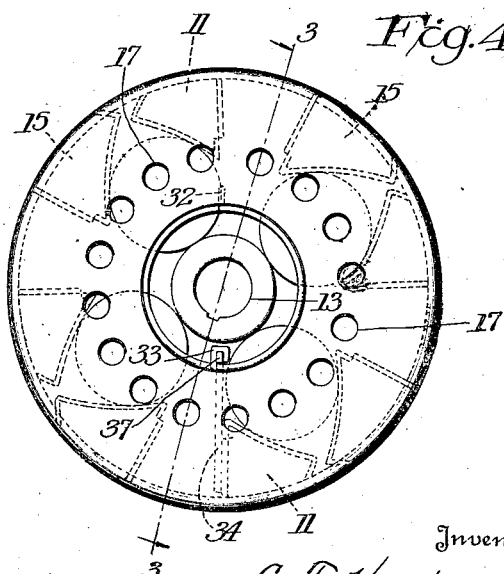
Inventor
C. F. Henderson
By Foster Freeman Watson & Coit
Attorney
Witness
G. S. Baker C. F. HENDERSON.
AUTOMATIC SPARK ADVANCING COUPLING.
APPLICATION FILED MAY 14, 1917.
1,304,768.
Patented May 27, 1919.
2 SHEETS—SHEET 2.
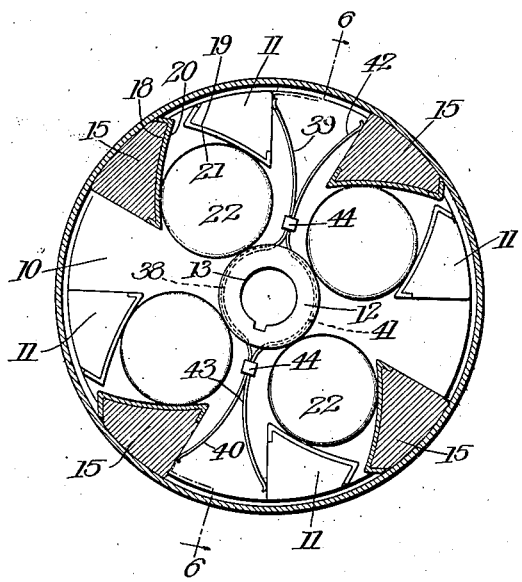
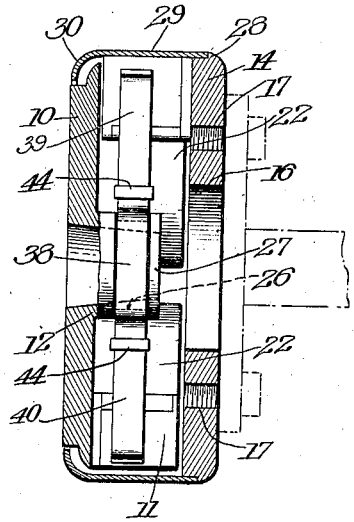
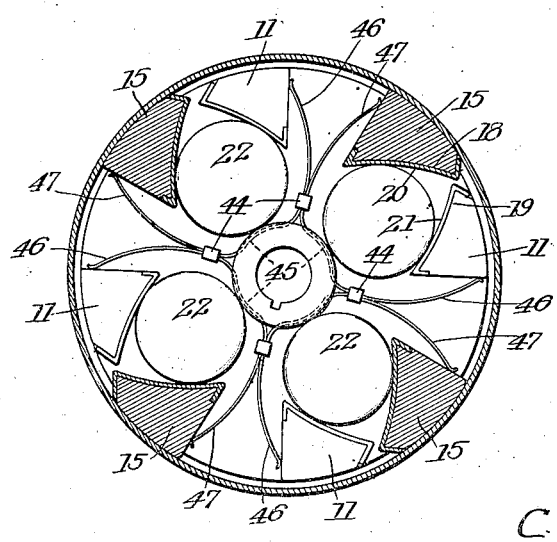

UNITED STATES PATENT OFFICE.

CHARLES F. HENDERSON, OF SAN FRANCISCO, CALIFORNIA.

AUTOMATIC SPARK-ADVANCING COUPLING.

1,304,768.　　　Specification of Letters Patent.　　Patented May 27, 1919.

Application filed May 14, 1917. Serial No. 168,531.

*To all whom it may concern:*

Be it known that I, CHARLES F. HENDERSON, a citizen of the United States, residing at San Francisco, San Francisco county, and State of California, have invented certain new and useful Improvements in Automatic Spark-Advancing Couplings, of which the following is a specification.

This invention relates to an automatic spark advancing coupling. The principal object of the invention is to provide a spring means for resisting relative angular movement of the two members of the coupling which can be manufactured at a small cost and can be assembled in the coupling quickly and easily. Another object is to provide a coupling of this type which can be made from die castings. Other objects will be apparent from the description taken in connection with the drawings in which, Figure 1 is a sectional elevation taken substantially on the line 1—1 of Fig. 2 and looking in the direction of the arrows.

Fig. 2 is a sectional elevation taken substantially on the line 2—2 of Fig. 1 and looking in the direction of the arrows.

Fig. 3 is a sectional elevation of another form of the invention taken substantially on the line 3—3 of Fig. 4, and looking in the direction indicated by the arrows.

Fig. 4 is a side elevation of the form shown in Fig. 3.

Fig. 5 is a sectional elevation similar to Fig. 1 and showing still another form and arrangement of the spring means.

Fig. 6 is a sectional elevation taken substantially on the line 6—6 of Fig. 5, the hub of the disk 10 being shown in elevation.

Fig. 7 is a sectional elevation similar to Figs. 1 and 5 showing another embodiment of the invention with a spring means similar to that shown in Fig. 5.

The coupling includes a disk member 10 having near the periphery of one of its faces a plurality of axially extending projections or lugs 11 and a central projecting hub 12. The disk and hub are formed with a conical bore 13 which is adapted to receive the conical end of a driving shaft. A second disk 14 is provided at the periphery of one of its faces with a series of axially projecting lugs 15 which are adapted to be arranged in the spaces between the lugs 11 and the disk 10. This disk 14 is formed with a large axial bore 16 and a plurality of threaded openings 17 which are arranged in a circle concentric with the axis of the coupling and is adapted to be connected to a flange of the magneto or other ignition apparatus by studs extending from the said flange and engaging the threaded openings 17. As a plurality of these openings 17 are provided the disk 14 may be attached to the magneto flange in proper angular relation thereto.

As clearly shown in Fig. 1, one pair of the adjacent or opposed faces 18 and 19 of the lugs 15 and 11 respectively are curved and provided with wear plates 20 and 21 which may be secured thereto in any suitable manner. Rollers 22 are interposed between the opposed wear plates 20 and 21 and as the angular velocity of the coupling increases tend to force the pairs of lugs 11 and 15 apart to thereby angularly move one member of the coupling with respect to the other. In order to resist this angular movement and also prevent lost motion and play of the rollers 22, means is provided to yieldingly act on the two members of the coupling tending to force the pairs of lugs 11 and 15 toward each other. For this purpose a coil spring 23 is centrally arranged surrounding the axis of the coupling. The curved body portion of the spring is seated on the hub 12 and has one end 24 thereof projecting outward toward the periphery of the coupling and engaging the flat side of one of the lugs 15. The other end 25 of the spring also projects outwardly from the hub and is adapted to contact with the flat side of one of the lugs 11. It will thus be apparent that the spring acts on the two members of the coupling to force the lugs 15 toward the lugs 11 and to resist any separating movement of these lugs. As shown in Figs. 1 and 2, the spring 23 is seated in an annular groove 26 formed in the hub 12. For this purpose the hub may be turned down slightly and provided with an end collar 27 which may be secured to the hub in any desired manner or formed integral therewith.

The disk 14 is formed with a peripheral shoulder 28 and is adapted to support an axially extending housing 29 which incloses the parts between the two disks and has a rounded edge portion 30 which projects over the periphery of the disk 10.

It will be apparent that the construction for supporting the spring can be made at a minimum cost and the spring assembled in the device very easily and quickly. Furthermore in the case of the spring breaking another one can be substituted very readily. The provision of the wear plates 18 and 19 permits the disks with their attached lugs to be formed as die castings at a very small cost and all machine work is practically eliminated.

Figs. 3 and 4 illustrate another construction of an axially arranged spring to resist relative rotation of the disks. In this form the coil spring 31 is arranged within the bore 16 of the disk 14, and has one end 32 thereof attached to the disk 14 and the other end formed with an eye 33 which is adapted to be engaged by a member carried by the other part of the coupling. For this purpose a plate 34 is attached to the flat side of one of the lugs 11 as by means of screws 35 and projects inwardly to a point adjacent the hub 36 of the disk 10. At its inner end the plate 34 is formed with an axially projecting finger 37 which is adapted to engage in the eye 33 of the axially arranged spring 31. Thus this spring consists of a curved body portion concentric with the axis of the coupling and has an end acting against one member of the coupling and another end acting against the other member. It is apparent that the entire coupling may be assembled very easily and that this spring 31 can be removed or inserted without disturbing the coupling parts.

Referring to Figs. 5 and 6 another embodiment of the invention is illustrated. As clearly shown in these figures the coupling members may be of the same form as illustrated by Figs. 1 and 2, the spring means, however, is different, and consists of a spring having a curved centrally arranged body portion 38 seated in the annular groove 26 of the hub and having the opposite substantially radially extending end portions 39 and 40. As shown one of these end portions 39 is adapted to coöperate with a lug 11 and the other end portion 40 with a lug 15. Thus the spring tends to force the two members of the coupling so that the lugs 11 and 15 are held against the rollers 22. Another spring similar to the one just described has a centrally arranged body portion 41 with the substantially radially extending end portions 42 and 43, the end portion 42 adapted to act against a lug 15 and the end portion 43 adapted to act against a lug 11. The two adjacent end portions 39 and 42 may be fastened together if desired by means of a clip 44 arranged near the hub 12. Likewise the two adjacent end portions 40 and 43 may also be held together by a like clip 44. It will be apparent that although the form of spring shown in these figures has a body portion extending an angle of substantially 180° that the spring may be formed with a body portion having a different length either more or less than that shown. For example in Fig. 7 a spring means for acting on the two members is shown which consists of four springs each having a body portion 45 subtending an angle of substantially 90° and seated in the groove 26 of the hub and formed with a substantially radially extending end portion 46 adapted to act against a lug 11 and another substantially radially extending portion 47 adapted to act against a lug 15. The adjacent end portions 46 and 47 may be fastened together by a clip 44 in the same manner as described in connection with Figs. 5 and 6.

Referring to the different forms of the invention illustrated it will be observed that the spring means for acting on the two members of the coupling consists of a curved body portion concentric with the axis of the coupling and having an end thereof acting against one of the coupling members and another end acting against the other coupling member, the body portion of the spring being arranged centrally of the coupling and close to the axis thereof. A spring of this construction can be made cheaply and assembled in the coupling and the coupling members assembled with a minimum amount of labor. Furthermore it is an easy matter to replace a broken spring or to take the coupling apart and put it together again.

Although the various embodiments of the invention have been described specifically it is obvious that the details thereof may be varied without departing from the spirit of the invention.

Having described the invention what is claimed and desired to be secured by Letters Patent is:

1. In an automatic spark advancing coupling comprising a driving member having an axially extending lug, a driven member having an axially extending lug arranged opposite the first lug, a roller interposed between said lugs adapted to move outward and separate said lugs as the angular velocity of the members increase, the improvement which comprises a centrally arranged spring having a radially extending part engaging one of said lugs and another radially extending part engaging the other of said lugs.

2. In an automatic spark advancing coupling having one member adapted to be connected to a driving shaft and another member adapted to be connected with a distributer, and means for varying the angular relation of these two members as the angular velocity of the driving member changes, the improvement which includes an axially arranged spring having outwardly extending parts, one part operative on one member and another substantially on the other member to resist relative angular movement of the members.

3. In an automatic spark advancing coupling comprising a driving member having an axially extending lug, a driven member having an axially extending lug arranged beside the first lug, the opposed side faces of said lugs being curved, a roller interposed between said curved faces and adapted to move outward and separate said lugs as the angular velocity of the members increase, the improvement which consists in a centrally arranged spring operative to resist outward movement of the said roller.

4. An automatic spark advancing coupling comprising a die-cast disk having angularly spaced axially extending lugs and the periphery of the disk being formed with an annular shoulder, a second die-cast disk having angularly spaced axially extending lugs arranged beside the lugs on the other disk, the opposed adjacent faces of the lugs being curved and provided with hardened wear plates, a roller interposed between each pair of opposed wear plates, an annular housing seated against said shoulder and extending over the other disk, and a centrally arranged spring to resist outward movement of said members.

5. In an automatic spark advancing coupling comprising a driving member having an axially extending lug, a driven member having an axially extending lug arranged beside the first lug, the opposed side faces of said lugs being curved, a roller interposed between said curved faces and adapted to move outward and separate said lugs as the angular velocity of the members increase, the improvement which consists in a centrally arranged spring operative to resist outward movement of the said roller, said spring consisting of a curved body portion concentric with the axis of the coupling and having an end acting against one of said members and another end acting against the other member.

6. In an automatic spark advancing coupling, a driving member having an axially extending lug, a driven member having an axially extending lug arranged beside the first lug, one of said members having a hub extending toward the other member, a roller interposed between said lugs adapted to move outward and separate said lugs as the angular velocity of the members increase, the improvement which includes a spring seated in a groove in said hub, said spring consisting of a curved body portion concentric with the axis of the coupling and an end portion acting against one of said lugs and another end portion acting against the other of said lugs.

In testimony whereof I affix my signature.

CHARLES F. HENDERSON.

Witnesses:
  EDNA LOVE,
  C. R. SEAGER.